K. G. HUNT.
CLOTHES LINE SUPPORTING DEVICE.
APPLICATION FILED FEB. 2, 1911.

1,035,706.

Patented Aug. 13, 1912.

Witnesses
W. H. Hunt
W. S. Brown

Inventor
Kittie G. Hunt

UNITED STATES PATENT OFFICE.

KITTIE G. HUNT, OF WICHITA, KANSAS.

CLOTHES-LINE-SUPPORTING DEVICE.

1,035,706.  Specification of Letters Patent.  Patented Aug. 13, 1912.

Application filed February 2, 1911. Serial No. 606,158.

*To all whom it may concern:*

Be it known that I, KITTIE G. HUNT, a resident of Wichita, in the county of Sedgwick and State of Kansas, have invented certain new and useful Improvements in Clothes-Line-Supporting Devices; and I do hereby declare the following to be a full, clear, and exact description of the invention, such as will enable others skilled in the art to which it appertains to make and use the same.

My invention relates to clothes-line supporting devices but which may be employed to equal advantage with lines used for other purposes.

My object is to provide a device of this class which shall be simple in construction, economical in cost, reliable, durable and efficient in use, and to these ends the invention consists of the features hereinafter described in the specification illustrated in the accompanying drawings, and succinctly defined in the appended claims.

Figure 1:
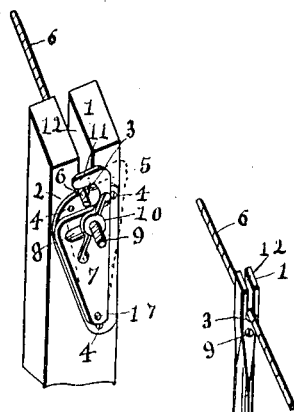
Figure 2:
Figure 3:
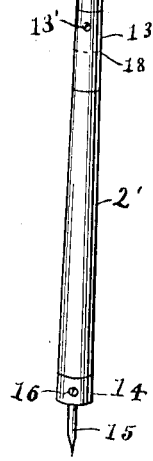

In the drawings Figure 1, is a perspective view of the upper end of my device. Fig. 2, a view of a casting having a laterally extending member on which the line rests. Fig. 3, a general view of the supporter as would appear in use.

My supporter is made in two sections 1, and 2', and is joined together with a ferrule on thimble 13, which is affixed to section 1, with a screw 13'. On the lower end of section 2', I place a band 14, and in the end of said section a spike 15, which is to stick into the ice or frozen ground, and is secured therein by a screw 16, passing through the said band and spike. Section 2' is positioned in the thimble 13, and joins section 1, as shown by the dotted lines 18. The object in having my supporter in two sections is for convenience of handling and storing. In the top end of section 1, is a slot 12. A casting 2, having a lateral extension 3, is affixed to section 1, with screws 4. The member 3, being positioned in the slot 12, said extension being provided with a semicircular groove 3'. The object of this extension is to carry the line, being preferable to a wood, as a small wire line when weighted heavily with a quantity of wet clothes would cause the said line to soon cut the wood away. I have provided a casting 7, with an oblong slot 8, and a hook 11, which I pivotally secure to the casting 2, with a rivet 17, which passes through the hole 17'. A bolt 9, is passed through section 1, and the casting 2, and through the oblong opening 8. The casting 7, can be positioned as desired and rigidly clamped by means of a thumb-screw 10. As illustrated in Fig. 1, the line 6, is positioned in the slot 12, on the extension 3, and the hook 11, positioned thereover and rigidly clamped. It is obvious the line can not by any means get out of the slot 12, but when it is desired to remove the line the thumb-screw 10 can be loosened and the hook 11, swung back in the position indicated by the dotted line 5, and the line 6, lifted out of the slot.

Having described the construction and assembling of my device what I claim is:—

1. In a line supporter in two sections, one section having a slot therein, in combination with a casting having a lateral extension, a longitudinal semicircular groove therein and a casting having an oblong slot and a hook, pivoted to the before mentioned casting and means for clamping the pivoted casting in the desired position.

2. The combination of a casting having a lateral extension a longitudinal semicircular groove therein, a casting having an oblong opening therein and a hook pivoted to the before mentioned casting, and means for clamping said castings in the desired position.

In testimony whereof, I have signed this specification in the presence of two subscribing witnesses.

KITTIE G. HUNT.

Witnesses:
 W. S. BROWN,
 W. H. HUNT.

Copies of this patent may be obtained for five cents each, by addressing the "Commissioner of Patents, Washington, D. C."